United States Patent [19]

Papchenko et al.

[11] Patent Number: 4,787,303

[45] Date of Patent: Nov. 29, 1988

[54] APPARATUS FOR PROCESSING VEGETABLE RAW MATERIAL

[75] Inventors: Andrei Y. Papchenko; Mircha K. Bologa; Semen E. Berzoi, all of Kishinev, U.S.S.R.

[73] Assignee: Institut Prikladnoi Fiziki, Kishinev, U.S.S.R.

[21] Appl. No.: 102,908

[22] Filed: Sep. 30, 1987

[51] Int. Cl.[4] ............................................. A23L 3/00
[52] U.S. Cl. ...................................... 99/451; 99/483; 99/510
[58] Field of Search ............... 99/352, 451, 358, 483, 99/484, 646 R, 510, 509; 426/234–236, 241, 240, 237, 239; 422/20–22, 23, 186; 219/10.55 E, 10.55 R, 10.55 B, 10.55 F, 288, 291, 293; 210/748; 204/182, 302, 304

[56] References Cited

U.S. PATENT DOCUMENTS 4,608,920 9/1986 Scheglov et al. .................... 99/451

FOREIGN PATENT DOCUMENTS 428737 10/1972 U.S.S.R. .
888921 9/1979 U.S.S.R. .

Primary Examiner—Timothy F. Simone
Attorney, Agent, or Firm—Burgess, Ryan & Wayne

[57] ABSTRACT

An apparatus for processing a vegetable raw material comprises a casing mounted on shock absorbers and accommodating a drum having pins, electrodes and a control electrode connected to a relay. The apparatus also comprises a power regulator connected to the relay output and an input of a voltage regulator. The relay and voltage regulator are connected to the three-phase power supply. Each output of the voltage regulator is connected to a respective electrode.

2 Claims, 1 Drawing Sheet

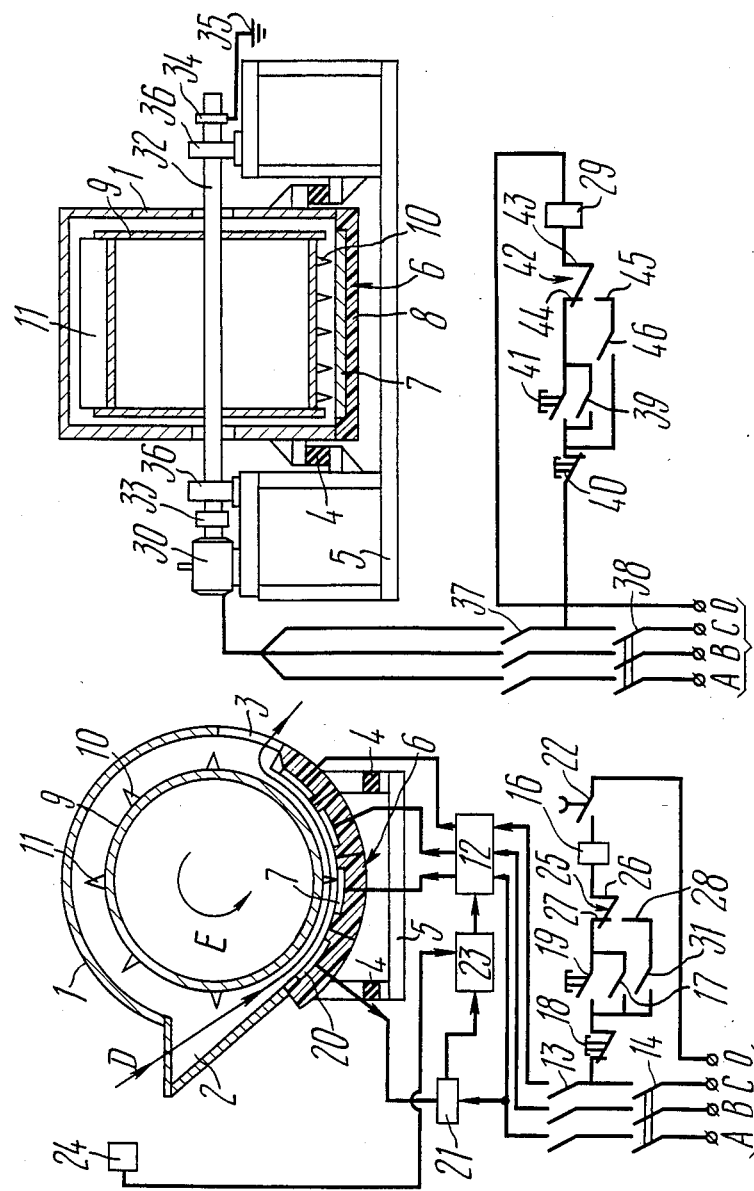

APPARATUS FOR PROCESSING VEGETABLE RAW MATERIAL

INDUSTRIAL FIELD TO BE APPLIED

The invention relates to processing of foodstuffs, and more particularly, to an apparatus for processing a vegetable raw material.

The invention may be used in production lines for initial processing of fruits, vegetables and root crops in producing juice, pulp, or plasmolyzed chip therefrom.

BACKGROUND OF THE INVENTION

Known in the art is an electroplasmolyzer for treating a vegetable raw material (SU, A, No. 428737), comprising a rectangular casing having inlet and outlet holes and accommodating two perforated plate electrodes extending in parallel with its longitudinal axis. Spaces which are to be filled with juice are defined between side walls of the casing and the perforated plate electrodes. In this electroplasmolyzer for treating a vegetable raw material, complete and uniform treatment of the comminuted vegetable raw material is not ensured, and the comminuted vegetable raw material is not compacted in the treatment zone. Therefore, this electroplasmolyzer for treating a vegetable raw material does not provide high yield of juice and the desired quality of the produced juice.

Also known in the art is an apparatus for processing a vegetable raw material (SU, A, No. 888921), comprising a casing having an inlet pipe and an outlet hole and accommodating a cylindrical drum having pins and electrodes electrically connected to a three-phase power supply and extending along the longitudinal axis of the casing in its lower part under the drum mounted for movement with respect to the electrodes.

In this apparatus for processing a vegetable raw material, the vegetable raw material is retained on the surface of the electrodes when a minimum amount of the vegetable raw material is supplied to the zone of electric current treatment resulting in the vegetable raw material being burned and efficiency of its treatment impaired. Therefore, high yield of a product is not provided, and quality of the product prepared from the vegetable raw material is impaired.

SUMMARY OF THE INVENTION

It is an object of the invention to provide an apparatus for processing a vegetable raw material, which makes it possible to increase the yield of a product prepared from the vegetable raw material during its processing and improve quality of the product.

The invention resides in that in an apparatus for processing a vegetable raw material, comprising a casing having an inlet pipe and an outlet port and accommodating a cylindrical drum having pins and electrodes electrically connected to a three-phase power supply and extending along the longitudinal axis of the casing in its lower part under the drum mounted for movement with respect to the electrodes, according to the invention there are provided shock absorbers supporting the casing, a control electrode extending along the longitudinal axis of the casing in its lower part under the drum and being located upstream the electrodes in the direction of flow of the vegetable raw material to the inlet pipe, a relay having its inputs connected to the control electrode and one phase of the three-phase power supply, respectively, a power regulator connected to the relay output, a voltage regulator having its first, second and third inputs connected to respective phases of the three-phase power supply, its fourth input connected to the output of the power regulator and each of its outputs connected to a respective electrode.

It is preferred that the apparatus for processing a vegetable raw material comprise at least two scrapers radially mounted on the surface of the drum along its generatrix and equally spaced thereon.

This apparatus for processing a vegetable raw material makes it possible to increase the yield of juice from a fruit and berry raw material and root crops, improve quality of the juice, ensure high quality of vegetable raw material processing and eliminate vegetable raw material burning due to the fact that it is retained on the surface of the electrodes. This invention makes it possible to improve efficiency and reliability of the apparatus for processing a vegetable raw material. This invention also makes it possible to reduce losses of sugar in a diffuser mounted downstream the apparatus for processing a vegetable raw material and improve quality of the diffusion juice in the sugar beet processing.

BRIEF DESCRIPTION OF DRAWINGS

The invention will now be described with reference to a specific embodiment shown in the accompanying drawings, in which:

FIG. 1 illustrates an apparatus for processing a vegetable raw material with a casing shown in a cross-section, according to the invention;

FIG. 2 is an apparatus for processing a vegetable raw material, a view taken along line II—II in FIG. 1 showing the casing of this apparatus, according to the invention.

DETAILED DESCRIPTION OF THE INVENTION

An apparatus for processing a vegetable raw material comprises a casing 1 (FIG. 1) having an inlet pipe 2 and an outlet port 3 and installed on four shock absorbers 4 mounted on a frame 5. The apparatus also comprises an electrode system 6 having three electrodes 7 mounted on insulators 8 and a drum 9 having pins 10 made of an insulating material, which are disposed inside the casing 1. The drum 9 is cylindrical. The electrodes 7 extend along the longitudinal axis of the casing 1 in its lower part under the drum 9 mounted for movement with respect to the electrodes 7. The apparatus also comprises two scrapers 11 radially mounted on the surface of the drum 9 along its generatrix and equally spaced thereon and a voltage regulator 12. First, second and third inputs of the voltage regulator 12 are connected, via power-circuit contacts 13 of a magnetic starter for feeding power supply to the voltage regulator 12 and a switch 14, to respective phases A, B and C of a three-phase power supply 15 having a neutral terminal 0. Each output of the voltage regulator 12 is connected to a respective electrode 7. The voltage regulator 12 may be of a known type ("Tiristory", Spravochnik, Labuntsov, 1971, pp. 247-248).

The magnetic starter for feeding power to the voltage regulator 12 comprises, in addition to the power-circuit contacts 13, a control coil 16, a make contact 17, a break button 18, and a make control button 19. The apparatus also comprises a control electrode 20, a relay 21 having a make contact 22 operating with a time delay when it is to be opened, a power regulator 23, a raw material flow pickup 24. Inputs of the relay 21 are connected to the control electrode 20 and phase A of the three-phase power supply 15, respectively, via the power-circuit contacts 13. The output of the relay 21 is connected to an input of the power regulator 23 having its output connected to a fourth input of the voltage regulator 12. The other input of the power regulator 23 is connected to the raw material flow pickup 24. The power regulator 23 may be of a known type (A. A. Chizhov. "Avtomaticheskoe regulirovanie i regulyatory v pischevoi promyshlennosti", 1984, Pischevaya promyshlennost (Moscow), p.194–195). The raw material flow pickup 24 may also be of a known type (E. B. Karpin. "Avtomaticheskoe nepreryvnoe dozirovanie sypuchikh i zhidkikh komponentov konditerskogo proizvodstva", TSNIITEI, Pischeprom, (Moscow), p.5–7). The control electrode 20 extends along the longitudinal axis of the casing 1 in its lower part under the drum 9 and is located upstream the electrodes 7 in the direction of flow of the vegetable raw material to the inlet pipe 2 as shown by arrow D in FIG. 1. Arrow E shows the direction in which the drum 9 moves. At least two scrapers 11 are provided in the apparatus because if the apparatus had been provided with only one scraper 11, the perfect cleaning of the surface of the electrodes 7 and control electrode 20 from the vegetable raw material would not be ensured. The apparatus also comprises a switch 25 having contacts 26, 27 and 28, a coil 29 (FIG. 2) of a magnetic starter of an electric drive 30, a make contact 31 (FIG. 1) connecting the contact 28 of the switch 25 to a fixed contact of the button 19. One lead of the coil 16 is connected, via the make contact 22, to the neutral terminal 0 of the three-phase power supply 15, the other lead is connected to the contact 26 of the switch 25 having its contact 27 connected in series, via the control buttons 18 and 19 and the switch 14, to phase C of the three-phase power supply 155. The make contact 17 of the coil 16 is connected in parallel with the make button 19.

The drum 9 (FIG. 2) is mounted on a shaft 32. A clutch member 33 and a current collector 34 connected to a ground 35 are also mounted on the shaft 32. The shaft 32 is journalled in bearings 36. The electric drive 30 is connected, via power-circuit contacts 37 of the magnetic starter for feeding power to the electric drive 30 and a switch 38, to phases A, B and C of the three-phase power supply 15. The magnetic starter for feeding power to the electric drive 30 also has a made contact 39, a break button 40, a make button 41, and a switch 42 having contacts 43, 44 and 45. One lead of the coil 29 is connected to the neutral terminal 0 of the power supply 15, the other lead is connected to the contact 43 of the switch 42. The contact 44 of the switch 42 is connected in series, via the make button 41, control break button 40 and switch 38, to phase C of the power supply 15. The make contact 39 of the coil 29 is connected in parallel with the make button 41. A make contact 46 of a magnetic starter of a diffuser (not shown in the drawings) connects the contact 45 of the switch 42 with a fixed contact of the make button 41.

The apparatus for processing a vegetable raw material functions as follows. At first, steps for preparing the apparatus for operation are performed. The switches 14 (FIG. 1) and 38 (FIG. 2) are switched on, and the switches 25 (FIG. 1) and 42 (FIG. 2) are set to a position corresponding to closure of the contacts 26 and 28 (FIG. 1), 43 and 45 (FIG. 2). The magnetic starter of the diffuser (not shown in the drawings) is then switched on, the make contact 46 in the circuit of the coil 29 of the magnetic starter for feeding power to the electric drive 30 being closed. As a result, the electric circuit of the coil 29 is made via the break button 40, make contact 46 and a contact between the contacts 43 and 45 of the switch 42. The coil 29 operates, the power-circuit contacts 37 are closed. The electric drive 30 is switched on to ensure rotation of the drum 9. Simultaneously with switching on of the electric drive 30, the make contact 31 (FIG. 1) in the circuit of the coil 16 of the magnetic starter for feeding power supply to the voltage regulator 12 and a contact in a control circuit of an electric drive of a vegetable raw material crusher (not shown in the drawing) are closed. The crusher is turned on. On leaving the crusher, the comminuted vegetable raw material is supplied, via the inlet pipe 2, to the treatment zone defined between the electrodes 7 and outside surface of the drum 9.

When a continuous vegetable raw material flow is provided, a contact is ensured between the control electrode 20 and outside surface of the drum 9 by the comminuted raw material, and a circuit consisting of the ground 35 (FIG. 2), current collector 34, shaft 32, surface of the drum 9, control electrode 20 (FIG. 1), and relay 21 is closed. The make contact 22 operating with a time delay when it is to be opened in the circuit of the coil 16 of the magnetic starter for feeding power to the voltage regulator 12 is closed. As a result, the electric circuit of the coil 16 is made via the break button 18, closed make contact 31 of the coil 29 (FIG. 2) and the contacts 26 and 28 (FIG. 1) of the switch 25, and power supply to the electrodes 7 is switched on by means of the contacts 13.

In the treatment zone, the comminuted vegetable raw material is compacted by four shock absorbers 4, and the electric current treatment is carried out. The raw material is then conveyed in the treatment zone to the outlet port 3 by means of the pins 10.

Fluctuations in the raw material density result in a varying degree of contact between the raw material and control electrode 20 and outside surface of the drum 9 resulting in a varying value of a signal applied to the relay 21. Thus, with the maximum preset density of the vegetable raw material in the treatment zone, the degree of contact is maximum, and the value of the signal applied to the relay 21 will be at maximum. With the minimum preset density, the degree of contact between the raw material and the electrode 20 and drum 9, hence, the value of a signal from the control electrode 20 abruptly decreases. The signal from the relay 21 is applied to an input of the power regulator 23 which generates a signal taking into account a signal from the raw material flow pickup 24. This signal is applied to the fourth input of the voltage regulator 12 and then to the electrodes 7. Thus, the voltage regulator 12 maintains the preset value of the specific electric energy consumption by varying voltage on the electrodes 7. After electric treatment, the raw material is supplied, through the outlet port 3, to a press or diffuser where juice is produced therefrom. The diffuser and press are not shown in the drawings.

Thus, due to electric current treatment of the vegetable raw material with compaction of the raw material in the treatment zone to a preset density by means of the shock absorbers 4 resulting in an improved contact between the vegetable raw material and electrodes 7 and due to electric current treatment with a preset specific electric energy consumption, an increase in the yield of a product prepared from the vegetable raw material and an improvement of quality thereof are provided. Power supply to the zone of electric current treatment in an amount required for the electric current treatment is provided by means of the control electrode 20, relay 21, power regulator 23, voltage regulator 12. When raw material supply to the treatment zone is interrupted, or when the raw material density in the treatment zone decreases below the preset raw material density, the contact between the control electrode 20 and surface of the drum 9 is broken resulting in that the relay 21 is de-energized, and its contact 22 in the circuit of the coil 16 opens after a preset time delay so as to break the circuit of the coil 16. The power-circuit contacts 13 are opened, and power supply to the voltage regulator 12 and electrodes 7 is interrupted. When the raw material flow in the treatment zone is resumed, the control electrode 20 comes in contact with the surface of the drum 9. A signal is applied to the relay 21, the make contact 22 opening upon a time delay is closed, power supply to the voltage regulator 12 and electrodes 7 is resumed. When the diffuser (not shown in the drawing) is switched off, the make contact 46 (FIG. 2) in the circuit of the coil 29 is opened, the coil 29 is de-energized, the contacts 37 are opened, the electric drive is switched off. The make contact 31 (FIG. 1) in the circuit of the coil 16 is also opened. The coil 16 is de-energized, the power-circuit contacts 13 are opened, power supply to the electrodes 7 is interrupted. The contact in the circuit of the magnetic starter of the electric drive of the crusher (not shown in the drawing) is also opened, the operation of the crusher being interrupted.

In the setup mode of the apparatus, the switches 25 FIG. 1 and 42 (FIG. 2) are set to a position corresponding to closure of the contacts 27 and 26 (FIG. 1) and 44 and 43 (FIG. 2), and control of the power-circuit contacts 37 and 13 (FIG. 1) is carried out by means of the break buttons 18 FIG. 1 and 40 (FIG. 2) and make buttons 19 (FIG. 1) and 41 (FIG. 2).

When the comminuted raw material is conveyed in the treatment zone, the flexible scrapers 11 clean the surface of the electrodes 7, 20 from vegetable raw material particles deposited thereon so as to prevent raw material from burning. This also contributes to an increase in the yield of the product and improvement of its quality.

Thus, this invention makes it possible to increase the yield of a product prepared from the vegetable raw material and improve its quality.

We claim:

1. An apparatus for processing vegetable raw material,
    comprising:
    (1) shock absorbers for providing a preset density to the vegetable raw materials;
    (2) a casing, mounted on the shock absorbers having a longitudinal axis and a lower part;
    (3) the casing having an inlet pipe, an outlet port, and a central electrode and power electrodes disposed inside the casing and extending along the longitudinal axis of the casing in the lower part thereof, the power electrodes being in communication with a three phase power supply;
    (4) a drum having pins for conveying the vegetable raw materials from the inlet pipe to the outlet port of the casing, the drum having a cylindrical shape, accommodated in the casing and mounted for rotary movement relative to the electrodes, the electrodes being arranged under the drum; the control electrode for mounting the presence of the vegetable raw material supplied to the inlet pipe of the casing, being located upstream of the power electrodes in the direction of flow of the vegetable raw materials;
    (5) a relay for disconnecting a power supply when the flow of the vegetable raw material is interrupted, the relay having a first and a second input and an output, the first input to the central electrode and the second input connected to one phase of the three-phase power supply;
    (6) a power regulator for regulating power in accordance with the density and flow rate of the vegetable raw material, the power regulator having an input connected to the output of the relay and to the output of a flow pickup and an output;
    (7) a voltage regulator for regulating the voltage at the power electrodes, having a first, a second, a third and a fourth input and three power outputs, the first, second and third inputs being connected to the respective phases of the three-phase power supply, the fourth input being connected to the output of the power regulator, each power output being connected to a respective power electrode;
    (8) a means for rotating the drum in the casing.

2. An apparatus for processing a vegetable raw material according to claim 1, comprising
    at least two scrapers for cleaning surfaces of said electrodes and said control electrode, radially mounted on the surface of said drum along its generatrix and equally spaced thereon.

* * * * *